June 14, 1960        W. R. WATSON        2,940,864

METHOD OF PREPARING A FLUORESCENT SCREEN

Filed March 24, 1954

INVENTOR
WILLIAM R. WATSON
BY
ATTORNEY

United States Patent Office 2,940,864
Patented June 14, 1960

2,940,864
METHOD OF PREPARING A FLUORESCENT SCREEN

William R. Watson, Flushing, N.Y., assignor, by mesne assignments, to Sylvania Electric Products Inc., Wilmington, Del., a corporation of Delaware Filed Mar. 24, 1954, Ser. No. 418,433
1 Claim. (Cl. 117—17.5)

This invention relates to a method of preparing a cathode ray screen. More particularly, it relates to a method suitable for preparing cathode ray screens coated with a plurality of phosphors positioned thereon in a desired pattern.

The cathode ray screen of the all-electronic color picture tubes consists of a group of symmetrically placed dots or lines of phosphors on a glass screen. One screen design in particular consists of an array of some 351,000 dots of phosphor on a 9" x 12" screen arranged in clusters of three dots including one each of the primary colors. Each cluster of three dots must be suitably located with respect to a corresponding hole in a thin perforated metal sheet placed a short distance (about 0.8") from the phosphor screen if the cathode ray tube is to give the desired results. Since the placing of these dots of phosphor on the screen in spaced relation with one another and in alignment with a hole in the spaced metal sheet is critical it has been found that methods for applying such phosphor dots to the screen such as printing or silk screening techniques are not normally satisfactory. The problems encountered with silk screening techniques are numerous in that not only is registration a problem but the application of the second and third series of dots leads to variations in dot sizes which are brought about by the increased spacing between the printing mask and plate caused by the presence of the first series of dots on the glass screen. When printing techniques are used it is most difficult to transfer sufficient material to make a dot in a single impression. Air settling of the phosphor onto a tacky surface through a mask has also been proposed. This method, however, results in a dot pattern in which the individual dots do not have sufficient density. In fact, all of the methods which have heretofore been tried for making these tri-color screens have only been suited for hand operation where a small number of screens were needed but not for any methods which might be considered commercially economical.

It is an object of this invention to provide a commercially economical method of making a screen in which the phosphor is laid down in a particular design.

It is a further object of this invention to provide a method for making screens having a plurality of phosphors by a method which is adapted for commercial operation.

It is a still further object of this invention to provide a simple method of making a tri-color screen in which the various phosphors will be accurately spaced with respect to one another.

It has been found that these objects and other advantages can be achieved with the use of a technique in which the phosphor is caused to deposit upon a tacky film while subjecting the particles of phosphor to an electrostatic field.

In the drawings which illustrate features of this invention:

Figure 1:
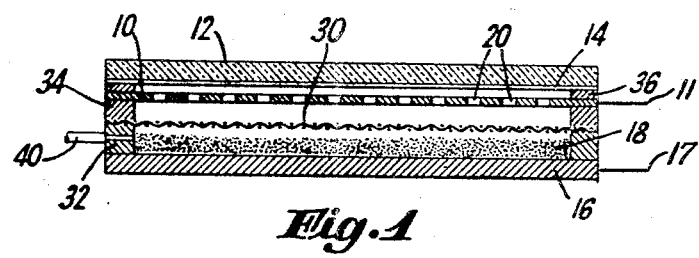
Figure 1 is a front elevation showing one embodiment of a device in which the phosphor particles can be electrostatically deposited onto a glass surface.
Figure 2:
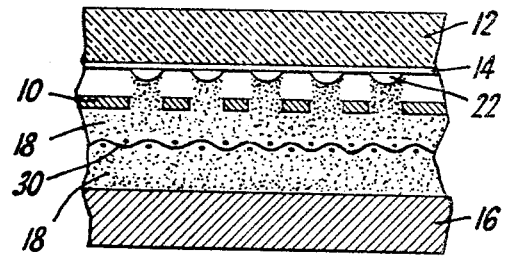
Figure 2 is an enlarged sectional view of Figure 1 illustrating the manner in which the particles oscillate between charged plates and deposit onto a glass plate.

The present invention is based primarily on the tendency of a small particle to oscillate in the electrostatic field between two conductive plates. This takes place because the particle on striking one plate acquires a charge such that it is successively attracted to the other plate. If one plate has a hole in it the particle will eventually pass through the hole in a direction nearly normal to the plate.

The process of this invention consists in principle of placing phosphor powder between two conductive plates, the upper one being a mask having an area with holes corresponding to the desired area of dots. This masking plate is illustrated at 10 in the drawings. A glass panel is then placed over the mask as shown at 12. The undermost surface of this glass panel, that is, the surface facing the masking plate 10 is provided with a tacky coating 14. The lower plate, as shown at 16, is covered with a loose layer of dry phosphor powder 18 which is introduced through the tube 40. A potential difference is then applied between the two plates by means of leads 11, 17 connected to plates 10, 16 so that the powder will oscillate in the field between the plates and find its way through the holes 20 in the mask 10 to corresponding points on the tacky surface 14 of the glass plate 12. After an array of dots 22 have been formed by this manner the masking plate 10 or the glass panel 12 can be indexed with respect to one another. A new plate with a new phosphor can then be substituted for plate 16 or the remaining phosphor may be cleaned out from the space between the plates 10, 16 and replaced by other phosphor particles of another kind or color whereupon other arrays of dots can be formed in a similar fashion. Naturally if it is desired the same results can be achieved by substituting a new masking plate 10 which has its holes arranged in a different position. In fact, the operation could conceivably be carried out at three stations where the panel 12 is carried to each in turn. This would require three marks and the registry of the panel at each station. This would have the advantage of reducing contamination of phosphor as each mark and base plate would be exposed to only one kind (color) of phosphor.

Various methods could be devised to bring or place the phosphor onto the plate 16 preparatory to charging them. One method as illustrated in Figure 1 of the drawing would be to blow a charge of the powder in through the tube 40 after the respective parts have been assembled to form the chamber in which the particles are charged.

In the embodiment of the apparatus as illustrated in the drawing a screen is shown as being positioned between the spaced plates 10 and 16. This screen 30 is used primarily to break up any lumps which may be present in the phosphor and thus make certain that only the finely divided particles of phosphor will reach the tacky surface behind the masking plate. This screen 30 is held in position by means of annular rings of insulating material 32 and 34 which space the screen from the conductive plates and keep is insulated therefrom. In the embodiment shown in Figure 1 the tacky surface of the glass 12 is also held in spaced relationship to the masking plate by means of an annular ring member 36. This holds the tacky surface 14 out of engagement with the masking plate and insures that the phosphor which reaches it will have a good tacky surface on which to deposit.

The conductive sheets of material which are to be used to produce the electrostatic field may, of course, be made of any conductive material. The primary function is to provide a good conductive surface. The plate 16 may, for example, be made of normal aluminum sheet material or may, on the other hand, be made of a material such as graphite. The annular insulating members 32 and 34 may also be made of any of the normal insulating materials known to the art. The prime function of these materials is to insulate and space the component parts from one another. Bakelite is an example of a material which may be so used. There are, of course, many other plastics in the field which would do equally as well. The distance which the two plates are spaced from one another could vary over a relatively large range depending upon the particles which one would expect to use. Excellent results have been obtained when the total distance between the two conductive plates was in the neighborhood of ¼". The wire screening or mesh 30 which is shown as being stretched across the area between the two conductive plates 10 and 16 may, of course, also vary considerably. The primary function of this screen is to break up any agglomerates which may be present in the phosphor. A wire mesh having 325 holes to the inch has been found to be a satisfactory material for this purpose. The masking plate 10 can also be made of any conductive material providing it is further provided with holes which are spaced from one another in such manner as to produce the desired design when particles of phosphor pass therethrough. When this method is used to make the cathode ray screens of picture tubes the regular masking plate which is to be used in the tube may be used for this purpose. On the other hand this is not essential. Any conductive plate which has the right size holes properly spaced from one another may be used for this purpose.

Figure 3:
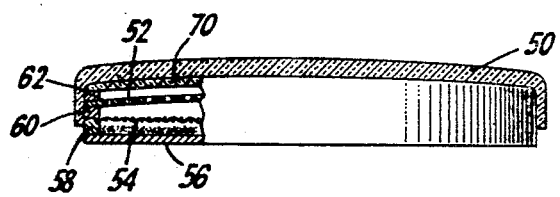
Figure 3 is a front elevation partly in section illustrating the use of the method in applying phosphor particles to the face plate of a cathode ray tube.

In the embodiment illustrated in the drawings the phosphor dot pattern is being produced on a glass panel 12. It is, of course, not essential in the operation of this method that this panel be made of glass nor that it be a straight panel as shown in Figure 1 of the drawings. If the mask is dished out so as to conform with the face plate of a normal cathode ray tube this process can be used for the application of the dots directly to the surface of the face plate. This is indicated in Figure 3 of the drawings wherein 50 represents the face plate of a cathode ray tube, a dished-out masking plate, 54 a wire mesh, 56 a second conductive plate and the insulating spacers 58, 60 and 62 as there shown. The phosphor particles 70 are ultimately deposited onto the tacky surface of the face plate at the points directly opposite the holes in the masking plate.

The material for producing the tacky film on the plate or surface on which the dots are to be placed may, of course, vary over a wide range. The primary requisite for such a material is that it present a tacky film for a sufficient length of time to permit the electrostatic deposition of the phosphor particles in a manner to obtain the desired pattern and that the tacky material can later be baked out or sufficiently removed from the surface so as not to interfere with the functioning of the cathode ray tube when it has been completed. A thin layer of silicone grease has been found suitable for this purpose.

Other tacky materials suitable for this purpose include phosphoric acid, deposited as smoke on moist glass or moistened with water vapor. Potassium silicate or sodium silicate solutions which would remain tacky in high humidity atmosphere and nitro-cellulose lacquers may also be used. These latter materials, however, present a serious explosion hazard if sparking were to occur.

The potentials which can be used to create the electrostatic field can of course range over rather wide limits. For the illustrated spacing between the conductive plate a potential of the order of 7–10 kv. has been found to be satisfactory.

The advantages of this system of dusting are the formation of more dense and compact dots due to higher velocities of the particles, more rapid formation resulting in less tendency of the tacky surface to dry or otherwise change between the successive steps of applying the second and third phosphors. The advantages over printing are a greater tolerance for lack of co-planarity between mask and glass than between printing plate and glass and the assurance of a sufficiently heavy and dense deposit. The advantage of this method over the method where a tacky substance is printed as dots and those dots wherein the excess powder is brushed off lies in the fact that this method will produce less contamination than the previously formed dots and would not facilitate the removal or loosening of previously formed dots as would inevitably occur when loose undesired particles are to be removed by brushing.

Although the illustrative embodiment has dealt specifically with the manufacture of tri-color screens consisting of groups of symmetrically placed dots, it is to be expressly understood that the invention finds application in the manufacture of screens having successive lines of different color-emitting phosphors. Accordingly in the appended claims the terms "apertured" and "apertured mask" are intended to include round apertures and elongated slit-like apertures.

While the above description and drawings submitted herewith disclose a preferred and practical embodiment of the fluorescent screen of this invention it will be understood that the specific details of construction and arrangement of parts as shown and described are by way of illustration and are not to be construed as limiting the scope of the invention.

What is claimed is:

In the method of preparing a fluorescent screen, the steps comprising coating the surface of the screen with a thin film of a tacky material, positioning the film coated surface above a conductive plate and in spaced relationship thereto, said plate having perforations therethrough conforming to the desired screen pattern to be produced, said plate being further held in spaced relationship to a second conductive plate and insulated therefrom, introducing a phosphor powder between said conductive plates, applying a potential difference between said plates and thereby causing the powder to oscillate in the field, pass through the perforations in said first conductive plate and deposit onto the tacky film, removing the screen from the assembly and positioning it over a second perforated conductive plate but in indexed position with respect to the first conductive plate, said second perforated plate also being held in spaced relationship to a second conductive plate and being insulated therefrom, introducing a second phosphor powder between said plates and applying a potential difference between them and thereby causing the powder to oscillate in the field therebetween and pass through the perforations in said second conductive plate and deposit onto the tacky film.

References Cited in the file of this patent

UNITED STATES PATENTS

| 1,706,038 | Owens | Mar. 19, 1929 |
| 2,129,295 | Wurstlin et al. | Sept. 6, 1938 |
| 2,152,077 | Meston et al. | Mar. 28, 1939 |
| 2,173,032 | Wintermute | Sept. 12, 1939 |
| 2,187,624 | Melton et al. | Jan. 16, 1940 |
| 2,191,827 | Benner et al. | Feb. 27, 1940 |

(Other references on following page)

UNITED STATES PATENTS

| | | |
|---|---|---|
| 2,221,474 | Gardner | Nov. 12, 1940 |
| 2,252,590 | Wolfson | Aug. 12, 1941 |
| 2,278,742 | Scott et al. | Apr. 7, 1942 |
| 2,289,156 | Weinhart | July 7, 1942 |
| 2,310,863 | Leverenz | Feb. 9, 1943 |
| 2,334,112 | MacKinney | Nov. 9, 1943 |
| 2,394,656 | Beregh | Feb. 12, 1946 |
| 2,433,116 | Greenbowe et al. | Dec. 23, 1947 |
| 2,446,440 | Swedlund | Aug. 3, 1948 |
| 2,682,478 | Howse | June 29, 1954 |
| 2,687,360 | Michaels | Aug. 24, 1954 |

FOREIGN PATENTS

| | | |
|---|---|---|
| 592,360 | Great Britain | Oct. 1, 1947 |